United States Patent
Lee et al.

(10) Patent No.: US 10,528,077 B2
(45) Date of Patent: Jan. 7, 2020

(54) INSTRUCTION PROCESSING ALIGNMENT SYSTEM

(71) Applicant: The Boeing Company, Chicago, IL (US)

(72) Inventors: Wing C. Lee, San Marino, CA (US); Sean M. Ramey, Mill Creek, WA (US); Ronald James Koontz, Mesa, AZ (US); Dick P. Wong, Monterey Park, CA (US); Jackson Chia, San Gabriel, CA (US); Anthony S. Fornabaio, Scottsdale, AZ (US); Murali Rangarajan, Chesterfield, MO (US); Clarke Edgar Moore, Huntsville, AL (US); David Clyde Sharp, St. Louis, MO (US); Arnold W. Nordsieck, Bellevue, WA (US); Paul Eugene Denzel, Bothell, WA (US)

(73) Assignee: The Boeing Company, Chicago, IL (US)

( * ) Notice: Subject to any disclaimer, the term of this patent is extended or adjusted under 35 U.S.C. 154(b) by 86 days.

(21) Appl. No.: 15/819,402

(22) Filed: Nov. 21, 2017

(65) Prior Publication Data

US 2019/0155325 A1    May 23, 2019

(51) Int. Cl.
*G06F 1/12* (2006.01)
*G06F 13/42* (2006.01)
(Continued)

(52) U.S. Cl.
CPC . *G06F 1/10* (2013.01); *G06F 1/12* (2013.01)

(58) Field of Classification Search
CPC .......... G06F 1/10; G06F 1/12; G06F 11/1695; G06F 11/1683; G06F 11/1629; G06F 11/1641
See application file for complete search history.

(56) References Cited

U.S. PATENT DOCUMENTS

| 8,924,780 B2 | 12/2014 | Van Stensel |
| 2009/0044044 A1 | 2/2009 | Harter et al. |

(Continued)

FOREIGN PATENT DOCUMENTS

| EP | 2175371 A1 | 4/2010 |
| EP | 2592555 A2 | 5/2013 |
| WO | WO2007006013 A2 | 1/2007 |

OTHER PUBLICATIONS

European Patent Office Extended Search Report, dated Mar. 25, 2019, regarding Application No. 18195492.6, 7 pages.

(Continued)

*Primary Examiner* — Xuxing Chen
(74) *Attorney, Agent, or Firm* — Yee & Associates, P.C.

(57) ABSTRACT

A method for synchronizing processor units. An external synchronizer is communicated with to determine whether an undesired amount of skew is present between a first processor unit and a second processor unit in communication with a synchronization system. The first processor unit is selectively directed to perform an action without generating a needed result such that the undesired amount of skew between the first processor unit and the second processor unit is reduced when the undesired amount of skew is present in the first processor unit. The first processor unit and the second processor unit are associated with each other for a high integrity mode in which integrity checks are performed on corresponding messages generated by the first processor unit and the second processor unit.

24 Claims, 13 Drawing Sheets

(51) Int. Cl.
*H04L 5/00* (2006.01)
*H04L 7/00* (2006.01)
*G06F 1/10* (2006.01)

(56) References Cited

U.S. PATENT DOCUMENTS

2009/0193229 A1 7/2009 Aegerter et al.
2013/0125137 A1 5/2013 Diekema et al.

OTHER PUBLICATIONS

European Patent Office Extended Search Report, dated Mar. 21, 2019, regarding Application No. 18195505.5, 8 pages.
Lee et al., "Message Synchronization System," U.S. Appl. No. 15/819,147, filed Nov. 21, 2017, 59 pages.
Office Action, dated Jun. 6, 2019, regarding U.S. Appl. No. 15/819,147, 14 pages.

INSTRUCTION PROCESSING ALIGNMENT SYSTEM

CROSS-REFERENCE TO RELATED APPLICATION

This application is related to the following U.S. patent application Ser. No. 15/819147, entitled "Message Synchronization System," filed even date herewith, and incorporated herein by reference in its entirety.

BACKGROUND INFORMATION

1. Field

The present disclosure relates generally to an improved computer system and, in particular, to a method and apparatus for managing data flow for processor units in a computer system.

2. Background

Aircraft have many redundant components to increase the reliability, integrity, or reliability and integrity of different aircraft systems. For example, components may be duplicated to increase the reliability of a system, increase the integrity of the system, or increase the reliability and the integrity of the system. This redundancy may be in the form of a duplicate system to improve system performance. For example, computer systems in aircraft may include information redundancy in addition to hardware redundancy. Inaccuracy in information can occur through various sources such as software issues, radiation, or other causes of sources.

Information integrity may be obtained using error detection and correction processes running on computers in the aircraft. The integrity also can include redundancy. With redundancy, performing the same operation multiple times or running the same application on different computers or processor units to obtain multiple copies of the data may be used. These copies of the data may be checked to determine whether the copies match each other.

Some solutions rely on receivers to compare redundant copies of data while, others create the integrity at the data's source. For the latter, current solutions place single core processor units into two or more parallel lanes. Data bus lockstep checking is performed on the messages generated by these processor units. These types of processes are performed using external chips, modifications of the processor architecture, or some combination thereof. These types of solutions are customized for particular types of processors. As a result, when other types of processors are utilized, these solutions may not work well with the characteristics of those processors such as memory bus architecture, available comparison points, or other characteristics.

Therefore, it would be desirable to have a method and apparatus that take into account at least some of the issues discussed above, as well as other possible issues. For example, it would be desirable to have a method and apparatus that overcomes the technical problem of achieving data integrity when using processor units with a single core or using multiple cores while obtaining desired efficiency for processing data using processor units.

SUMMARY

An embodiment of the present disclosure provides a processor synchronization system comprising an internal synchronizer running on a first processor unit. The internal synchronizer is configured to communicate with an external synchronizer to determine whether an undesired amount of skew is present between the first processor unit and a second processor unit in communication with the external synchronizer. The internal synchronizer selectively directs the first processor unit to perform an action without generating a needed result such that an undesired amount of skew between the first processor unit and the second processor unit is reduced when the undesired amount of skew is present. The first processor unit and the second processor unit are associated with each other for a high integrity mode in which integrity checks are performed on corresponding messages generated by the first processor unit and the second processor unit.

Another embodiment of the present disclosure provides a method for synchronizing processor units. An external synchronizer is communicated with to determine whether an undesired amount of skew is present between a first processor unit and a second processor unit in communication with a synchronization system. The first processor unit is selectively directed to perform an action without generating a needed result such that the undesired amount of skew between the first processor unit and the second processor unit is reduced when the undesired amount of skew is present in the first processor unit. The first processor unit and the second processor unit are associated with each other for a high integrity mode in which integrity checks are performed on corresponding messages generated by the first processor unit and the second processor unit.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that increasing the integrity of data output is desirable when using any pair or grouping of processor units running one or more redundant applications. The illustrative embodiments recognize and take into account that a mode of operation for increasing the integrity of data is a high integrity mode of operation as compared to normal processing of data which is referred to as a standard integrity mode of operation.

Thus, the illustrative embodiments provide a method, apparatus, and system for managing data. In one illustrative example, a message management system comprises an integrity manager. The integrity manager has mixed integrity modes and is configured to manage an exchange of messages between processor units and an external node based on a selected mode in the mixed integrity modes. The integrity manager is located in hardware in communication with the processors and the external node and checks that redundantly calculated outputs from processor units match in a high integrity mode.

In another illustrative example, a processor synchronization system comprises an internal synchronizer running on a first processor unit. The internal synchronizer is configured to communicate with an external synchronizer to determine whether an undesired amount of skew is present between the first processor unit and a second processor unit in communication with the external synchronizer. The internal synchronizer is configured to selectively direct the first processor unit to perform an action without generating a needed result such that an amount of skew between the first processor unit and the second processor unit is reduced when undesired skew is present.

Figure 1:
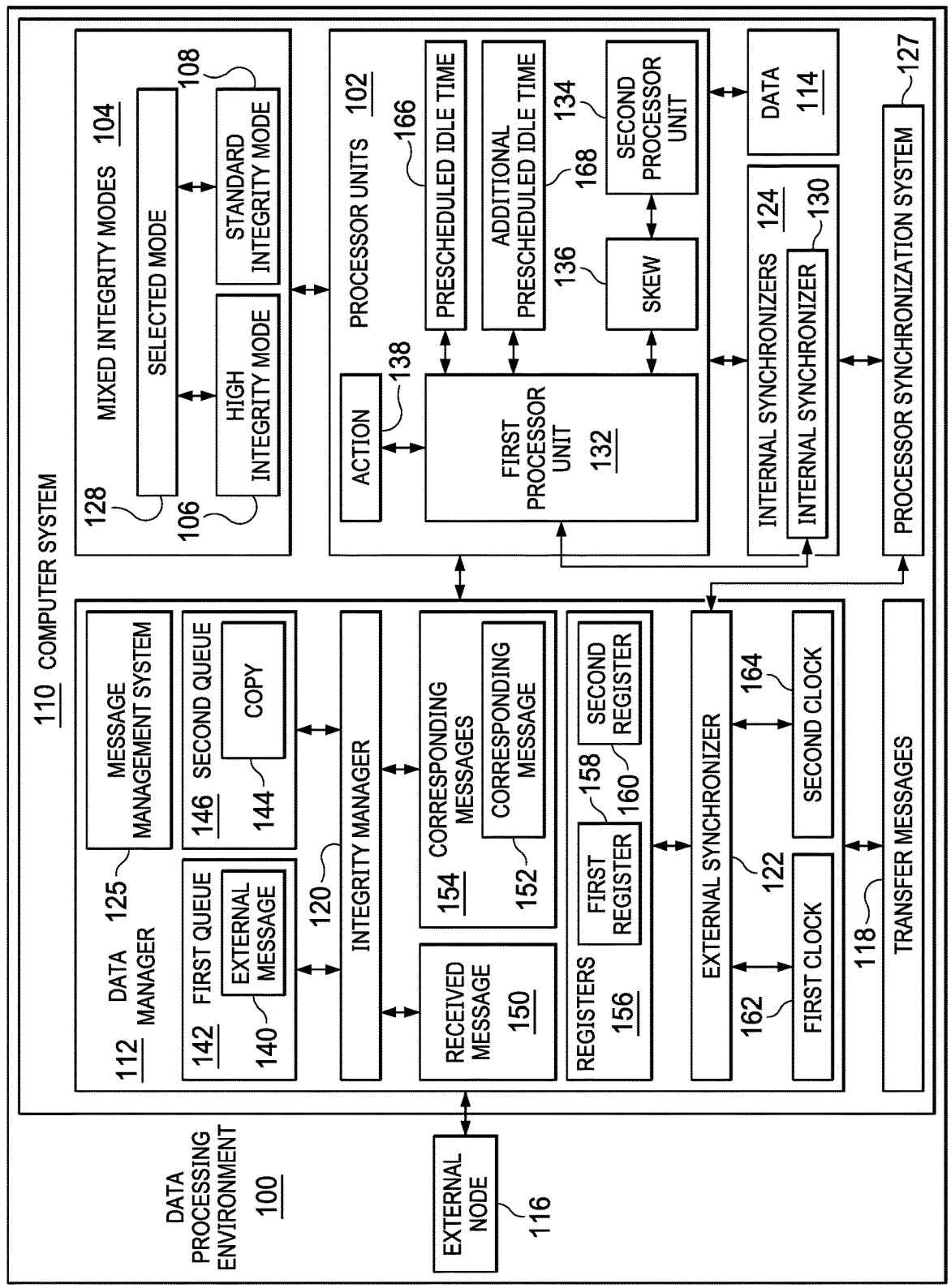
FIG. 1 is an illustration of a block diagram of a data processing environment in accordance with an illustrative embodiment.

With reference now to the figures and, in particular, with reference to FIG. 1, an illustration of a block diagram of a data processing environment is depicted in accordance with an illustrative embodiment. Data processing environment 100 is an environment in which processor units 102 can be managed in mixed integrity modes 104. In this example, processor units 102 are selected from at least one of a multi-core processor unit, a single core processor unit, a homogeneous multi-core processor unit, a heterogeneous multi-core processor unit, a graphics processor unit, a general-purpose processor unit, or some other suitable type of processor unit.

In the illustrative example, processor units 102 can be of the same type or of a different type. When processor units 102 are of the same type, those processor units may have at least one of the same instruction set, design, model, part number, or other parameters for defining the type for processor units 102.

In this illustrative example, mixed integrity modes 104 include high integrity mode 106 and standard integrity mode 108. At least one of message comparison or message synchronization between lanes for processor units 102 is performed in high integrity mode 106. In the illustrative example, a lane is a processing unit.

When in high integrity mode 106, integrity manager 120 checks that redundantly calculated outputs from multiple processor units in processor units 102 match. In the illustrative example, match means that data sent from the multiple processor units are the same. integrity manager 120 checks to ensure that the same data is being sent from multiple processor units.

For example, two processor units operating in high integrity mode 106 can run the same application and are instructed to perform the same function or processing of data. In high integrity mode 106, integrity manager 120 checks to ensure that the outputs generated by two processor units in processor units 102 are the same.

As depicted, processor units 102 are located in computer system 110. As depicted, computer system 110 is a physical hardware system and includes one or more data processing systems. When more than one data processing system is present, the processor units can be located in a single data processing system or in more than one of the data processing systems. Further, when more than one data processing system is present, those data processing systems are in communication with each other using a communications medium. The communications medium may be a network. The data processing systems may be selected from at least one of a computer, a server computer, a tablet, or some other suitable data processing system.

In this illustrative example, data manager 112 manages at least one of the processing of data 114 or the exchange of data 114 for processor units 102. As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

As depicted, data manager 112 is located in computer system 110. Data manager 112 may be located on the same or different data processing system from processor units 102 in computer system 110.

As depicted, data manager 112 manages the processing of data 114 by processor units 102. For example, when processor units 102 operate in high integrity mode 106, data manager 112 may align the timing of processor units 102 to process data 114. This alignment in timing may cause the processing of data 114 by processor units 102 to concurrently process data 114 in a synchronized fashion. In other words, processor units 102 run the same application to process data 114 to generate results at substantially the same time. These results may be generated by two or more of processor units 102 in which these results may be compared to determine the integrity of the results generated from processing data 114.

As depicted, two or more of processor units 102 can operate in high integrity mode 106 while other processor units in processor units 102 can operate in standard integrity mode 108. In other words, data manager 112 can manage processing and data with different modes in mixed integrity modes 104 at the same time. Mixed integrity modes 104 means that some of processor units 102 can operate in high integrity mode 106 while others processor units in processor units 102 can operate in standard integrity mode 108. Mixed integrity modes 104 also means that all of processor units 102 can operate in high integrity mode 106 or in standard integrity mode 108.

In other illustrative examples, data manager 112 can manage the exchange of data 114 with external node 116. When operating in high integrity mode 106, data manager 112 can align the timing of at least one of the receiving or transmitting of transfer messages 118 containing data 114. For example, data manager 112 can manage the receiving of messages by two or more of processor units 102 such that these processor units in processor units 102 receive the same messages in transfer messages 118 at substantially the same time, in substantially the same order, or some combination thereof.

These and other functions can be performed using a number of different functions within at least one of data manager 112 for processor units 102. For example, the functions can be performed using at least one of integrity manager 120 in data manager 112, external synchronizer 122 in data manager 112, or one or more of internal synchronizers 124 in processor units 102.

In one illustrative example, message management system 125 can be provided using integrity manager 120. In this illustrative example, integrity manager 120 has mixed integrity modes 104. As depicted, integrity manager 120 is configured to manage an exchange of transfer messages 118 between processor units 102 and external node 116 based on selected mode 128 in mixed integrity modes 104. In this illustrative example, integrity manager 120 is located in hardware in communication with processor units 102 and external node 116.

As depicted, external node 116 is located outside of computer system 110. In other examples, external node 116 can be located inside of computer system 110. External node 116 may take a number different forms. For example, external node 116 may be selected from a group comprising an external processor communicating with processor units 102, an embedded computer, a desktop computer, a network device, a network switch, and some other suitable type of external device.

In one illustrative example, a first portion of processor units 102 operate with a high integrity, and a second portion of processor units 102 operate with a standard integrity. Integrity manager 120 is configured to manage transfer messages 118 for the first portion of processor units 102 in high integrity mode 106 as selected mode 128, and manage transfer messages 118 for the second portion of processor units 102 in standard integrity mode 108 as selected mode 128. Transfer messages 118 are message that can be sent to or sent from processor units 102.

As depicted, integrity manager 120 is configured to manage processor units 102 operating simultaneously in high integrity mode 106 and standard integrity mode 108. This type of operation enables supporting mixed integrity modes 104 in which processor units 102 operate in at least one of high integrity mode 106 or standard integrity mode 108. In other words, processor units 102 may operate in either or both of these modes at the same time.

In this illustrative example, integrity manager 120 is configured to synchronize at least one of receiving transfer messages 118 for processor units 102 or transmitting transfer messages 118 for processor units 102 when selected mode 128 in mixed integrity modes 104 is high integrity mode 106.

For example, integrity manager 120 is configured to place external message 140 received in transfer messages 118 from external node 116 in first queue 142 for first processor unit 132 and place copy 144 of external message 140 in second queue 146 for second processor unit 134 when first processor unit 132 and second processor unit 134 operate using high integrity. Integrity manager 120 controls first queue 142 and second queue 146 such that both first processor unit 132 reads from first queue 142 and second processor unit 134 reads from second queue 146 to a same depth such that parallel lane coherency is present. In the illustrative examples, depth is the amount of messages in the queue.

In the illustrative example, in addition to managing queues, integrity manager 120 compares received message 150 received from first processor unit 132 with corresponding message 152 in corresponding messages 154 received from second processor unit 134. Integrity manager 120 sends received message 150 to external node 116 when received message 150 and corresponding message 152 match.

The comparison made by integrity manager 120 can be performed in a number of different ways. For example, the comparison can be made using at least one of a bit-by-bit compare or a cyclic redundancy check. In this example, integrity manager 120 discards received message 150 if a match is not present between received message 150 and corresponding message 152 or if corresponding message 152 is not received within a selected period of time that indicates an undesired amount of skew present. In this example, corresponding message 152 is discarded when a match is present.

Further, each of processor units 102 can truncate data values prior to transmitting messages to integrity manager 120 to reduce the accuracy of the values when integrity manager 120 compares the messages using a bit by bit comparison, which is an exact check. For example, if the values in the messages are 64 bits, all 64 bits are checked if truncating is not used. In some cases, undesired results can occur between processor units 102 operating in different lanes when processing data using a bit by bit comparison. As a result, processor units 102 can truncate one or more bits to reduce the accuracy level. Thus, a variable level of precision can be achieved by processor units 102 truncating bits when processor units 102 are in high integrity mode 106.

In another illustrative example, processor synchronization system 127 can be provided utilizing internal synchronizers 124 that communicate with external synchronizer 122. As depicted, internal synchronizer 130 in internal synchronizers 124 runs on first processor unit 132 in processor units 102.

Internal synchronizer 130 is configured to communicate with external synchronizer 122 in data manager 112 to determine whether an undesired amount of skew 136 is present between first processor unit 132 and second processor unit 134 in communication with external synchronizer 122. In the illustrative example, skew is the difference in time when signals are received from two or more processor units. Skew can be induced by clock skew and other factors between the processor units.

Internal synchronizer 130 is configured to selectively direct first processor unit 132 to perform action 138 without generating a needed result such that an amount of skew 136 between first processor unit 132 and second processor unit 134 is reduced when the undesired amount of skew 136 is present.

In one illustrative example of reducing skew 136 to align timing in processing by processor units 102, action 138 removes pre-scheduled idle time 166 from first processor unit 132 that reduces the amount of skew 136 between first processor unit 132 and second processor unit 134. Removing pre-scheduled idle time from a lagging processor unit causes that processor unit to skip ahead in time with respect to processing instructions. Internal synchronizer 130 is configured to remove additional pre-scheduled idle time 168 if the undesired amount of skew 136 is still present between first processor unit 132 and second processor unit 134 after removing pre-scheduled idle time 166.

In yet another illustrative example, first processor unit 132 is a leading processor unit and second processor unit 134 is a lagging processor unit, and the action causes first processor unit 132 to add idle time to cause first processor unit 132 to idle such that the lagging processor unit, second processor unit 134, can have aligned timing. In this manner, timing for the two processor units can be aligned for synchronous processing.

As depicted, first processor unit 132 and second processor unit 134 are associated with each other for high integrity mode 106 in which integrity checks are performed on corresponding messages 154 in transfer messages 118 generated by first processor unit 132 and second processor unit 134.

External synchronizer 122 can store information about the amount of skew 136 between first processor unit 132 and second processor unit 134. This information can be stored in registers 156 in external synchronizer 122 or other storage mechanisms. The information can be, for example, a flag or a group of bits that is set in registers 156. As used herein, "a group of," when used with reference to items, means one or more items. For example, "a group of bits" is one or more bits.

External synchronizer 122 stores information about the amount of skew 136 in registers 156. Internal synchronizer 130 is configured to write to first register 158 for first processor unit 132 in external synchronizer 122 and read second register 160 for second processor unit 134 in external synchronizer 122, and compares the values of first register 158 with second register 160 to determine when first processor unit 132 and second processor unit 134 are aligned in timing to synchronously process instructions.

In another illustrative example, external synchronizer 122 includes first clock 162 for first processor unit 132 and second clock 164 for second processor unit 134. First clock 162 and second clock 164 are used to align timing for first processor unit 132 and second processor unit 134 to synchronously process instructions.

At least one of integrity manager 120, external synchronizer 122, or internal synchronizers 124 may be implemented in software, hardware, firmware, or a combination thereof. When software is used, the operations performed by at least one of integrity manager 120, external synchronizer 122, or internal synchronizers 124 may be implemented in program code configured to run on hardware, such as a processor unit. When firmware is used, the operations performed by at least one of integrity manager 120, external synchronizer 122, or internal synchronizers 124 may be implemented in program code and data and stored in persistent memory to run on a processor unit. When hardware is employed, the hardware may include circuits that operate to perform the operations in at least one of integrity manager 120, external synchronizer 122, or internal synchronizers 124.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

For example, integrity manager 120 can be implemented in hardware as a single logic device or as a plurality of different types of logic devices. The different types of logic devices can be selected to reduce potential issues, such as common mode failures. For example, a first logic device can be a field programmable gate array, while a second logic device can be an application specific integrated circuit (ASIC). Further, when more than one logic device is used, each logic device has a lane through which messages are processed for a particular processor unit. The logic devices may have connections so the logic devices can be aligned in time.

In one illustrative example, one or more technical solutions are present that overcome a technical problem with obtaining desired efficiency in redundancy for processing data using processor units. As a result, one or more technical solutions may provide a technical effect increasing efficiency processing data by processor units. For example, one or more technical solutions may enable at least one of aligning the timing in the processing data or processing messages by processor units operating in a high integrity mode.

As a result, computer system 110 operates as a special purpose computer system in which at least one of data manager 112 or internal synchronizers 124 in computer system 110 enables managing the processing of data 114 in a manner that allows for mixed integrity modes 104 to be present during processing of data 114. In particular, at least one of data manager 112 or internal synchronizers 124 transforms computer system 110 into a special purpose computer system as compared to currently available general computer systems that do not have data manager 112, internal synchronizers 124, or both.

The illustration of data processing environment in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, data processing environment 100 is shown only with external node 116. In another illustrative example, one or more external nodes are present in addition to or in place of external node 116.

Although the illustrative example is described with respect to aircraft, other illustrative examples may be applied to other uses. For example, an illustrative example may be implemented for use in medical imaging, accounting, weather forecasting, or other suitable uses.

As yet another example, two processor units have been described in processor units 102. One or more of processor units 102 can be present in addition to or in place of first processor unit 132 and second processor unit 134.

For example, a third processor unit can be present in processor units 102. Internal synchronizer 130 is configured to communicate with external synchronizer 122 to determine whether an undesired amount of skew 136 is present between first processor unit 132, second processor unit 134, and the third processor unit in communication with the external synchronizer, and selectively direct first processor unit 132 to perform action 138 without generating a needed result such that an amount of skew 136 between first processor unit 132, second processor unit 134, and the third processor unit is reduced when the undesired amount of skew 136 is present.

For example, two integrity modes are shown for mixed integrity modes 104. In other illustrative examples, other numbers of integrity modes may be present. For example, three integrity modes, five integrity modes, or some other number of integrity modes can be utilized. These additional integrity modes, for example, use different numbers of comparisons. For example, with three integrity modes, an application may run on three different processor units in processor units 102 and process the same data. The outputs from the application running on the three processor units can be compared and voted by integrity manager 120 in data manager 112. In voting, the outputs from the three processor units are compared. A majority is identified for the output value. The majority can be two out of three or three out of three output values being the same. This output value is the value that is used. The minority output value is discarded.

Figure 2:
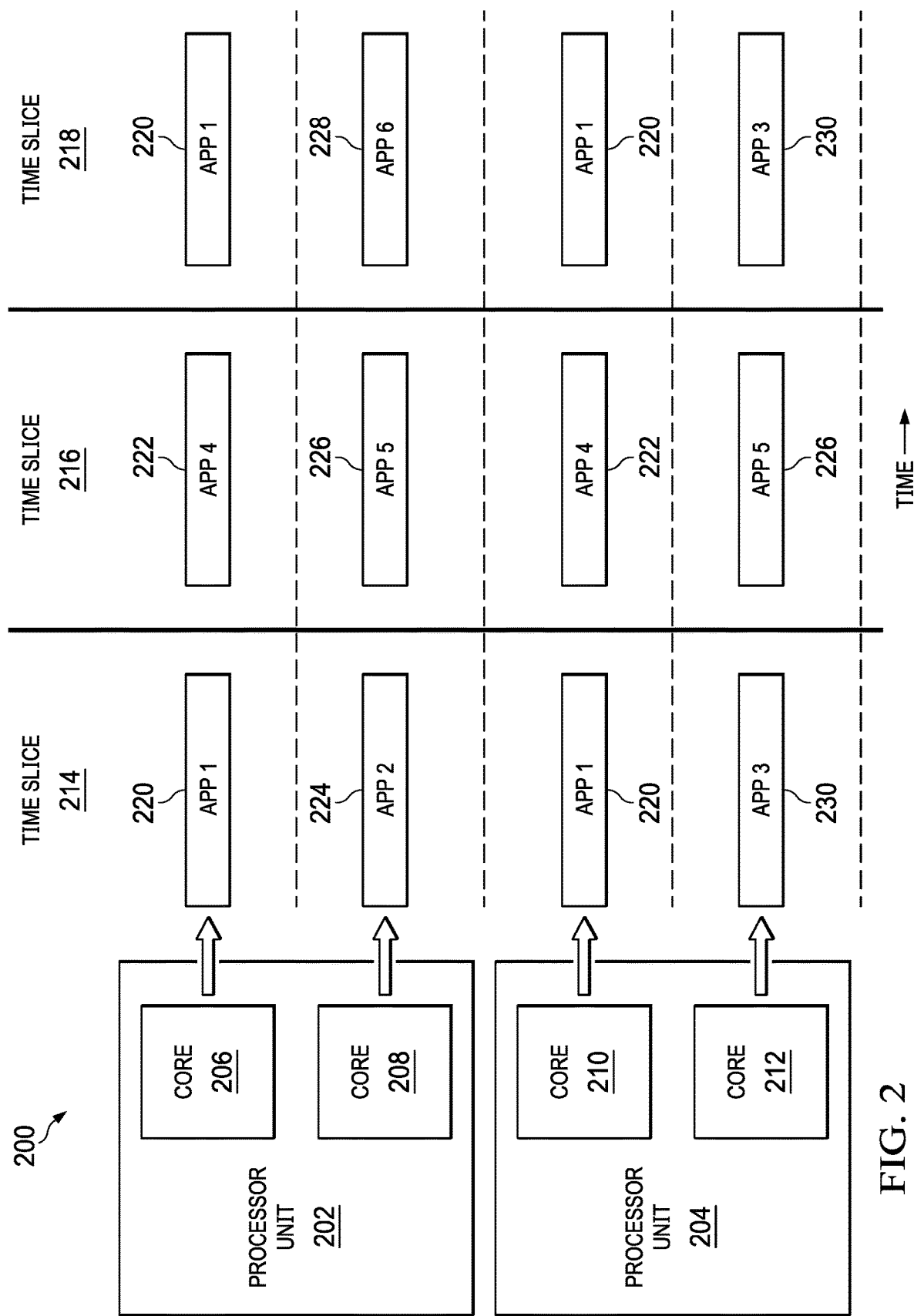
FIG. 2 is an illustration of a mixed integrity data processing system in accordance with an illustrative embodiment.

With reference next to FIG. 2, an illustration of a mixed integrity data processing system is depicted in accordance with an illustrative embodiment. In this illustrative example, mixed integrity data processing system 200 can be implemented using processor units 102 in FIG. 1 under the control of data manager 112 of FIG. 1.

In this illustrative example, processor unit 202 and processor unit 204 are multicore processors. As depicted, processor unit 202 includes core 206 and core 208. Processor unit 204 contains core 210 and core 212. As depicted, these different cores run applications during time slices, such as time slice 214, time slice 216, and time slice 218.

In this illustrative example, core 206 in processor unit 202 runs application 1 220 during time slice 214, application 4 222 during time slice 216, and application 1 220 during time slice 218. Core 208 in processor unit 202 runs application 2 224 during time slice 214, application 5 226 during time slice 216, and application 6 228 during time slice 218.

As depicted, core 210 in processor unit 204 runs application 1 220 during time slice 214, application 4 222 during time slice 216, and application 1 220 during time slice 218. Core 212 in processor unit 204 runs application 3 230 during time slice 214, application 5 226 during time slice 216, and application 3 230 during time slice 218.

Application 1 220 is run by core 206 in processor unit 202 and core 210 in processor unit 204 using a high integrity mode. In a similar fashion, application 4 222 is also run in a high integrity by core 206 and core 210. Core 208 in processor unit 202 and core 212 in processor unit 204 both run application 5 226 in a high integrity mode. Application 2 224, application 3 230, application 4 222, and application 6 228 are run in a standard integrity by core 210 in processor unit 204 and core 208 in processor unit 202. At least one of the processing of data or the exchange of messages are managed by data manager 112 in FIG. 1 to provide for the mixed integrity modes in this example. In some examples, the process can be applied to modes for cores to achieve a higher level of granularity.

The illustration of mixed integrity data processing system 200 is provided as an example of one implementation of how processor units 102 in FIG. 1 can be implemented for mixed integrity processing of data 114 in FIG. 1. This illustration is not meant to limit the manner in which other illustrative examples can be implemented. For example, other numbers of processor units can be implemented in other illustrative examples.

Figure 3:
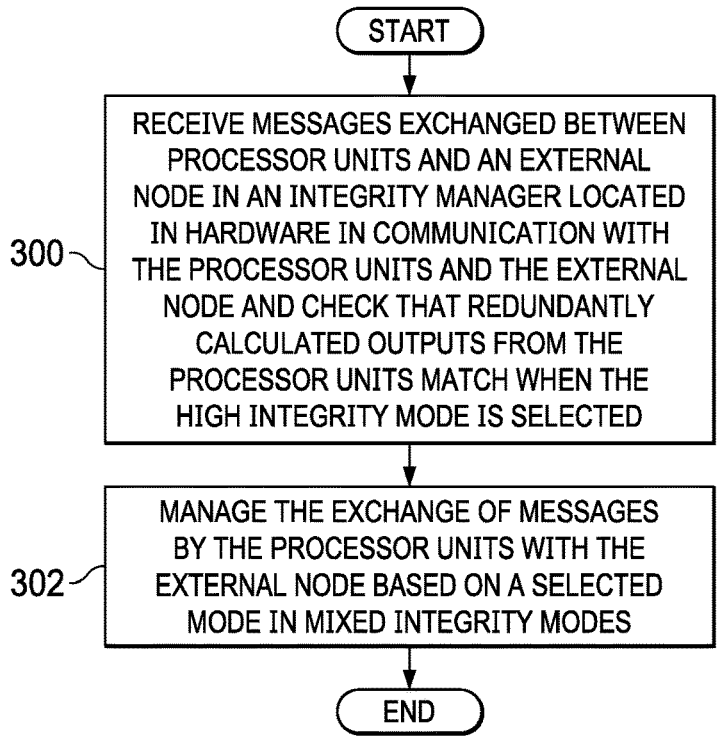
FIG. 3 is an illustration of a flowchart of a process for managing data transfer for a plurality of processors in accordance with an illustrative embodiment.

Turning next to FIG. 3, an illustration of a flowchart of a process for managing data transfer for a plurality of processors is depicted in accordance with an illustrative embodiment. The process illustrated in this figure can be implemented in integrity manager 120 in FIG. 1.

The process begins by receiving messages exchanged between processor units and an external node in an integrity manager located in hardware in communication with the processor units and the external node and checks that redundantly calculated outputs from the processor units match when the high integrity mode is selected (operation 300). The process manages the exchange of messages by the processor units with the external node based on a selected mode in mixed integrity modes (operation 302). The process terminates thereafter.

Figure 4:
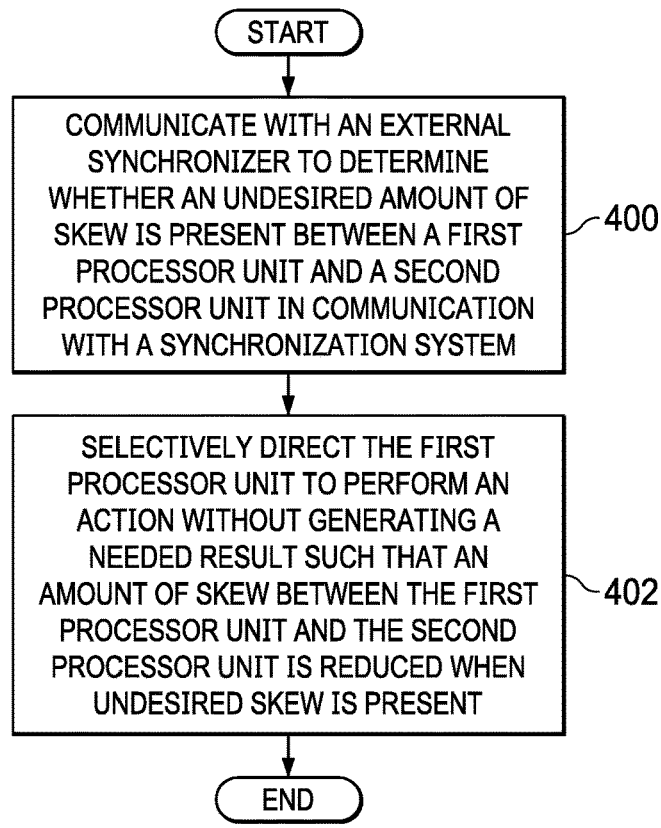
FIG. 4 is an illustration of a flowchart of a process for synchronizing processor in accordance with an illustrative embodiment.

With reference next to FIG. 4, an illustration of a flowchart of a process for synchronizing processor is depicted in accordance with an illustrative embodiment. The process illustrated in FIG. 4 can be implemented in internal synchronizer 130 in FIG. 1.

The process begins by communicating with an external synchronizer to determine whether an undesired amount of skew is present between a first processor unit and a second processor unit in communication with a synchronization system (operation 400). The process selectively directs the first processor unit to perform an action without generating a needed result such that an amount of skew between the first processor unit and the second processor unit is reduced when undesired skew is present (operation 402). The process terminates thereafter. In one illustrative example, this process can be used when the first processor unit and the second processor unit are associated with each other for a high integrity mode in which integrity checks are performed on corresponding messages generated by the first processor unit and the second processor unit.

Figure 5:
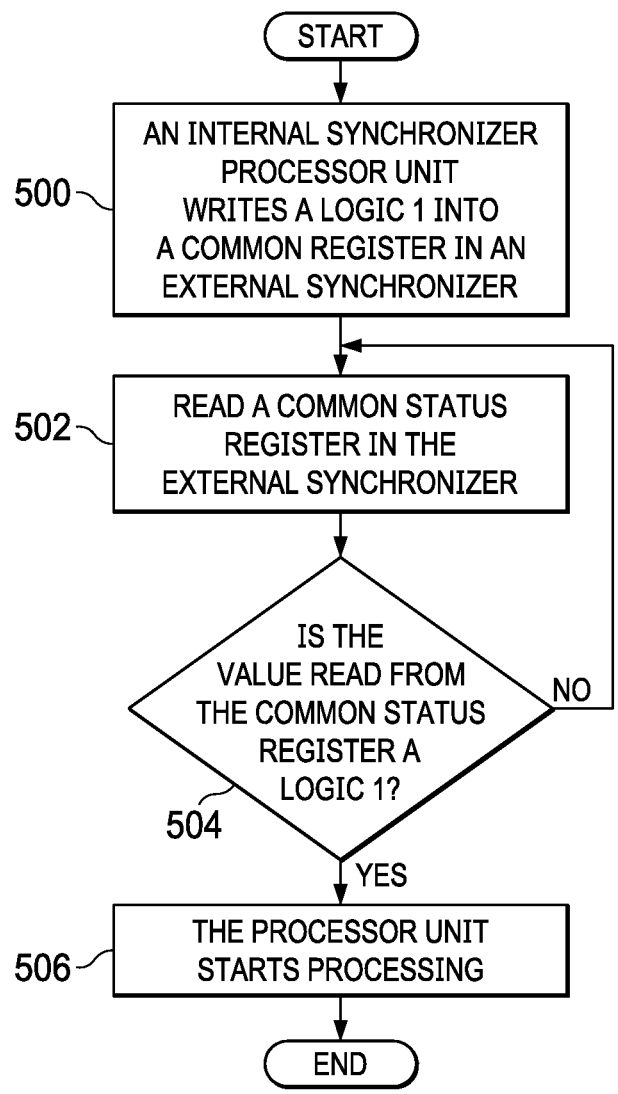
FIG. 5 is an illustration of a flowchart of a process for synchronizing processor units in accordance with an illustrative embodiment.

Turning next to FIG. 5, an illustration of a flowchart of a process for synchronizing processor units is depicted in accordance with an illustrative embodiment. The process depicted in FIG. 5 can be implemented in data processing environment 100 in FIG. 1. This process can be implemented in a processor unit in processor units 102 in FIG. 1. In particular, the process may be implemented in an internal synchronizer, such as internal synchronizer 130 running on first processor unit 132 in FIG. 1.

The process begins with an internal synchronizer processor unit writing a logic 1 into a common register in an external synchronizer (operation 500). The common register can be accessed by processor units enabling the alignment of the timing of processor units to each other for processing data. The processor units can be designed to run at a particular clock speed. However, actual physical implementations of the processor units may vary slightly from the specifications. This register can be used to align the timing processors during execution such that they execute instructions as close to the same time as possible in a synchronous manner.

The process reads a common status register in the external synchronizer (operation 502). A determination is made as to whether the value read from the common status register is a logic 1 (operation 504). A common status register is shared between processor units. A simple status register cannot be seen by more than one processor unit.

If the value is a logic 1, the processor unit starts processing (operation 506). The process terminates thereafter. In the illustrative example, the processing may include initialization, starting an application, continuing execution of an application, or some other suitable action. With reference again to operation 504, if the value is not a logic 1, the process returns to operation 502.

Figure 6:
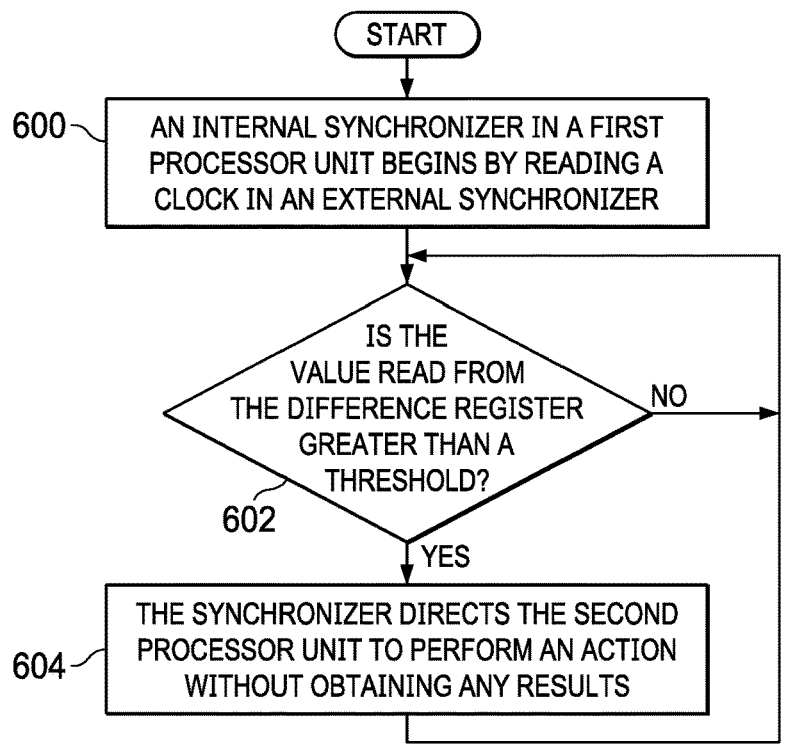
FIG. 6 is an illustration of a flowchart of a process for synchronizing processor units in accordance with an illustrative embodiment.

With reference now to FIG. 6, an illustration of a flowchart of a process for synchronizing processor units is depicted in accordance with an illustrative embodiment. The flowchart shows operations performed by an internal synchronizer running on a first processor unit, such as internal synchronizer 130 running on first processor unit 132 in FIG. 1. The process can be run by two or more processor units to synchronize the processing of instructions by the processor units.

In this example, each of the processor units has a clock that measures time that has elapsed. The clock can be a digital clock that measure real time as opposed to central processing unit time which measure the time that the process is actively working on a task.

As depicted, the clock can be an external clock read by the processor units. For example, the clock can be located in an external synchronizer. The clock measures chronological time in terms of dates, hours, minutes, and seconds rather than in processor cycles.

The process begins with an internal synchronizer in a first processor unit reading a clock in an external synchronizer (operation 600). The clock is for the first processor unit and is synchronized with clocks for any other processor units that are running the same application or set of instructions.

A determination is made as to whether the value read from the difference register is greater than a threshold (operation 602). The difference register stores a value that represents a difference between the current time for the clock and a snapshot of the time when the difference register was read by the internal synchronizer in a processor unit. In this illustrative example, the difference register is located in the external synchronizer.

The external synchronizer sets the difference register with a value representing the difference in times when the two processor units read the difference register. As depicted, a leading processor unit will obtain a value of zero. The lagging processor unit sees the actual skew time. For example, the lagging processor unit will obtain a number that is the difference between the time when the leading processor unit reads the difference register and when the lagging processor unit reads the difference register.

As depicted, the threshold can be selected based on a number of different factors. For example, the amount of skew allowed between two processing units may be used to set the threshold. If the value of the difference register is greater than the threshold, the synchronizer directs the second processor unit to perform an action without obtaining any results (operation 604).

In this illustrative example, the action is performed to speed up the lagging processor unit. For example, a prescheduled idle time lagging processor unit can be removed. Alternatively, the leading processor unit can be idled to allow the lagging processor unit to catch up. For example, when two processor units are running the same program using the same data, performing an action that does not include processing the data to obtain a result is considered an action that does not generate a needed result.

In another example, the action in operation 604 can be removing the spare partition or pre-scheduled idle time. In other words, removing a spare partition causes the processor unit to perform an action that is not performed by the corresponding application on another processor unit that is being synchronized with this processor unit. The process then returns to operation 602.

In operation 602, if the value of the difference register is not greater than the threshold, the process also returns to operation 602. In this case, the first processor unit is synchronized with the second processor unit or the first processor unit is lagging the second processor unit.

Figure 7:
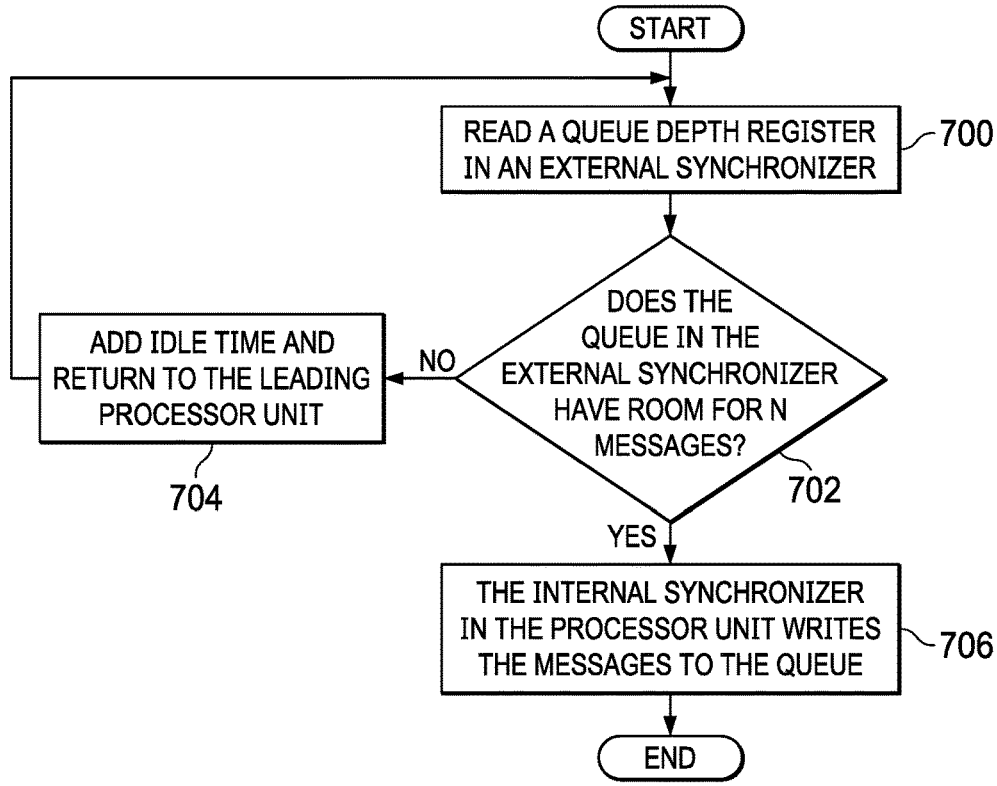
FIG. 7 is an illustration of a flowchart of a process for synchronizing the sending of messages from processor units in accordance with an illustrative embodiment.

With reference now to FIG. 7, an illustration of a flowchart of a process for synchronizing the sending of messages from processor units is depicted in accordance with an illustrative embodiment. The process illustrated in FIG. 7 is used by an internal synchronizer, such as internal synchronizer 130 running on first processor unit 132 in FIG. 1, to manage the sending of messages based on the messages queued in integrity manager 120. In other words, the process allows for messages to be gathered within the queue until the empty part of the queue is reduced below a predetermined threshold.

The process begins by reading a queue depth register in an external synchronizer (operation 700). The queue depth registers contain the queue depth which indicates how many messages are in the queue. The queue can be used to match messages being sent by two processor units.

A determination is made as to whether the queue in the external synchronizer has room for n messages (operation 702). In operation 702, n messages is a predefined number of messages. In one example, the queue can hold ten messages and the processor unit can write three messages each time. If the queue depth is nine, insufficient room is present in the queue for writing three more messages.

If the queue does not have room for n messages, the process adds idle time and then returns to the leading processor unit (operation 704). The process then returns to operation 700. This process loops until room is available to write three messages to the queue. As a result, the process unit does not place messages in the queue if the queue does not have room for n messages.

Otherwise, if the queue has room for n messages, the internal synchronizer in the processor unit writes the messages to the queue in the external synchronizer (operation 706). The process then terminates. The process can be restarted when additional messages are present for sending.

As a result, the integrity manager can control the first queue and the second queue such that the first processor unit reads from the first queue and the second processor unit reads from the second queue and both are performed to the same queue depth to maintain parallel lane coherency. Although the writing of the messages is shown as being performed by the internal synchronizer, this operation can be performed by another component within the processor unit with the internal synchronizer indicating when n messages can be written.

Figure 8:
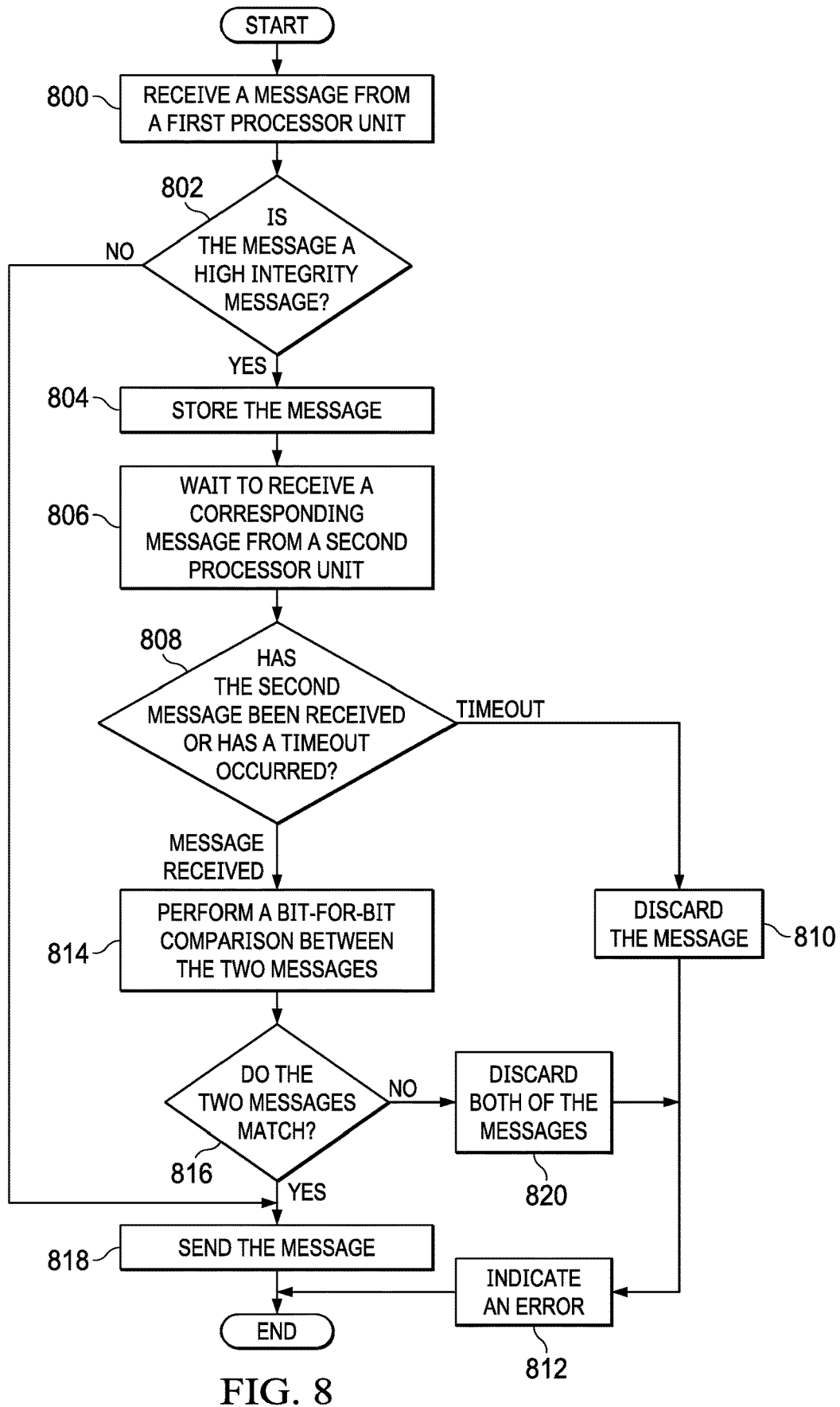
FIG. 8 is an illustration of a flowchart of a process for sending messages in accordance with an illustrative embodiment.

Turning to FIG. 8, an illustration of a flowchart of a process for sending messages is depicted in accordance with an illustrative embodiment. This process can be implemented in integrity manager 120 in FIG. 1 to align the timing of and ensure the integrity of redundantly generated outbound messages from processor units 102 in FIG. 1. In this example, each message is placed in a particular location in a queue based on an identifier. This identifier may be in the header of the message.

The process begins by receiving a message from a first processor unit (operation 800). The process determines whether the message is a high integrity message (operation 802). This determination may be made a number of different ways. For example, the header may include an indication as to whether the message is a high integrity message. In another illustrative example, a configuration file, a register, or some other sort of indicator may be checked to determine whether the message is a high integrity message.

If the message is a high integrity message, the process stores the message (operation 804). In operation 804, the message can be stored in various types of storage devices. For example, the message is stored in a queue, which may be implemented using a number of different types of devices. For example, the queue may be implemented using a buffer, a port array, or in some other suitable type of device. As depicted, port array is a dynamic set of buffers in which messages may be located in different locations rather than a particular location. With a port array, the integrity manager searches the buffers for the different processor units to pair up messages for processing. In other words, messages that should be compared may not be in the same order in the dynamic set of buffers.

The process waits to receive a corresponding message from a second processor unit (operation 806). A determination is made as to whether the second message has been received or a timeout has occurred (operation 808). If a timeout has occurred, the message is discarded (operation 810), and an error is indicated (operation 812). The process terminates thereafter.

With reference again to operation 808, if the second message has been received, the process performs a comparison between the two messages (operation 814). The comparison can be performed in a number of different ways. For example, a bit-for-bit comparison, comparing cyclic redundancy check signatures, and other techniques can be used.

A determination is made as to whether the two messages match (operation 816). If the two messages match, the process sends the message (operation 818). In this illustrative example, the message is sent onto a network. The process terminates thereafter.

Otherwise, the process discards both of the messages (operation 820). In operation 820, the messages are discarded because a match is not present. The process then proceeds to operation 812 as described above. With reference again to operation 802, if the message does not have high integrity, the process proceeds to operation 818 as described above.

Figure 9:
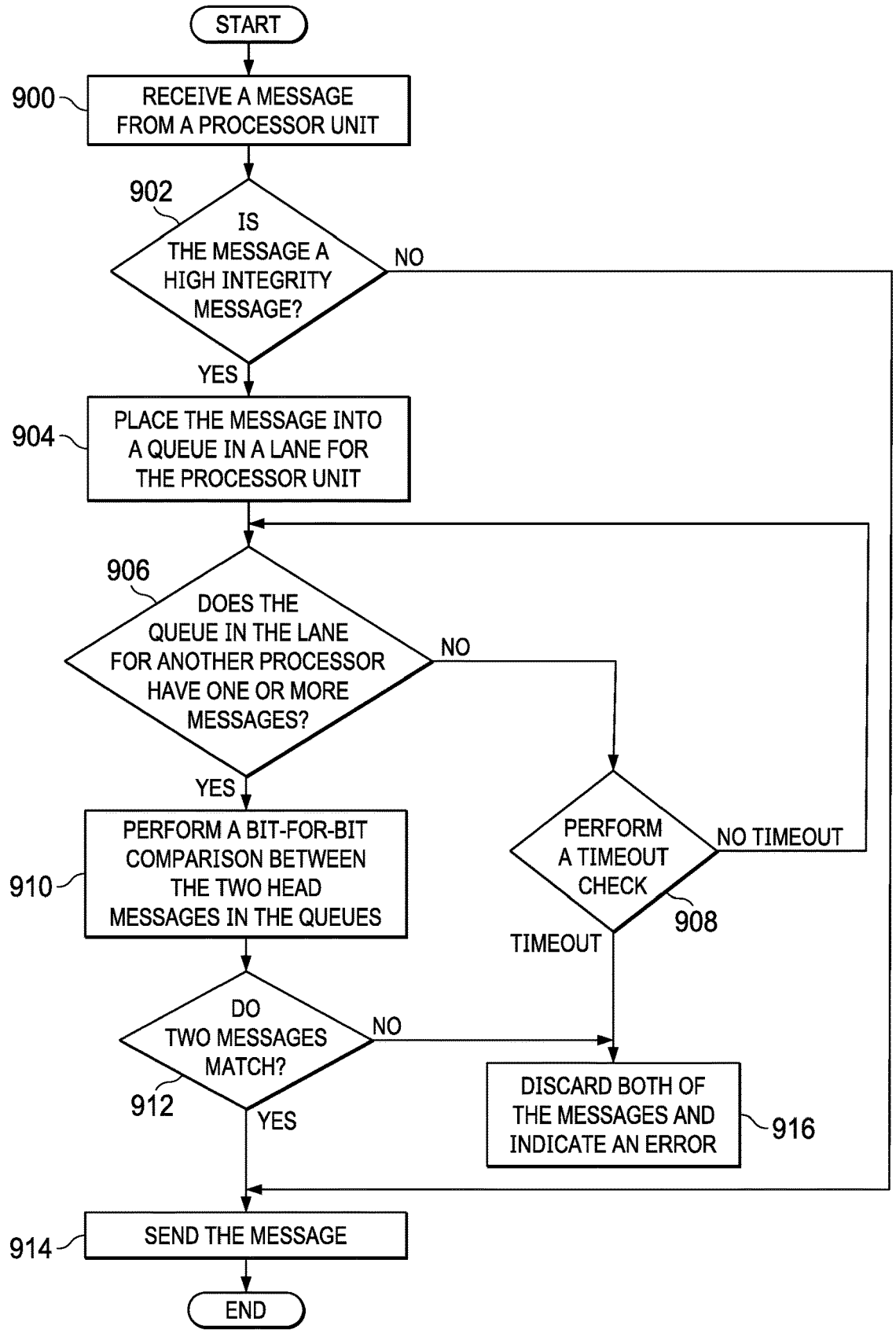
FIG. 9 is an illustration of a flowchart of a process for sending messages in accordance with an illustrative embodiment.

With reference next to FIG. 9, an illustration of a flowchart of a process for sending messages is depicted in accordance with an illustrative embodiment. This process can be implemented in integrity manager 120 in FIG. 1 to align the timing of and ensure the integrity of redundantly generated outbound messages.

The process begins by receiving a message from a processor unit (operation 900). A determination is made as to whether the message is a high integrity message (operation 902). If the message is a high integrity message, the process places the message into a queue in a lane for the processor unit (operation 904). As depicted, the queue is a first in first out (FIFO) queue and can be implemented as a buffer.

A determination is made as to whether the queue in the lane for another processor has one or more messages (operation 906). If the queue in the lane of the other processor does not have one or more messages, the process performs a timeout check (operation 908). If a timeout has not occurred, the process returns to operation 906.

If the other queue has one or more messages, the process performs a bit-for-bit comparison between the two head messages in the queues (operation 910). In this illustrative example, the head message is the next message to be pulled from the queue A determination is made as to whether two messages match (operation 912). If the two messages match, the process sends the message (operation 914). In this illustrative example, the message is sent onto the network. The process terminates thereafter. Otherwise, the process discards both of the messages and an error is indicated (operation 916).

With reference again to operation 902, if the message is not a high integrity message, the process proceeds to operation 914. Turning back to operation 908, if a timeout has occurred, the process proceeds to operation 916.

Figure 10:
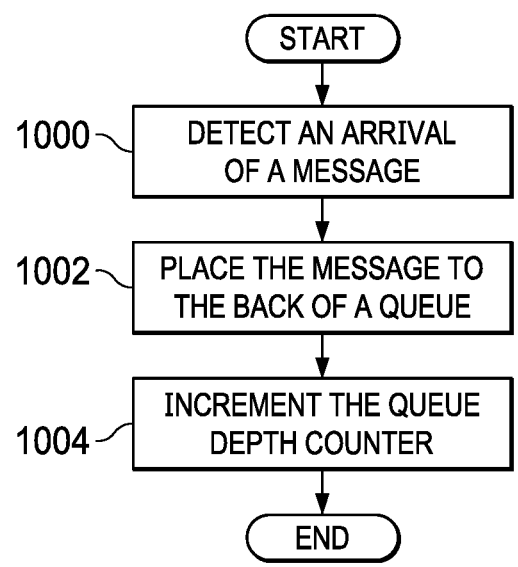
FIG. 10 is an illustration of a flowchart of a process for receiving messages in accordance with an illustrative embodiment.

In FIG. 10, an illustration of a flowchart of a process for receiving messages is depicted in accordance with an illustrative embodiment. This process can be implemented in an integrity manager. This process illustrates pulling messages.

The process begins by detecting an arrival of a message (operation 1000). The process places the message to the back of a queue (operation 1002). The process then increments the queue depth counter (operation 1004) with the process terminating thereafter. In this illustrative example, the queue depth counter can be used to indicate how the messages can be read. The integrity manager can use this queue depth counter to ensure that messages are read in the same order.

Figure 11:
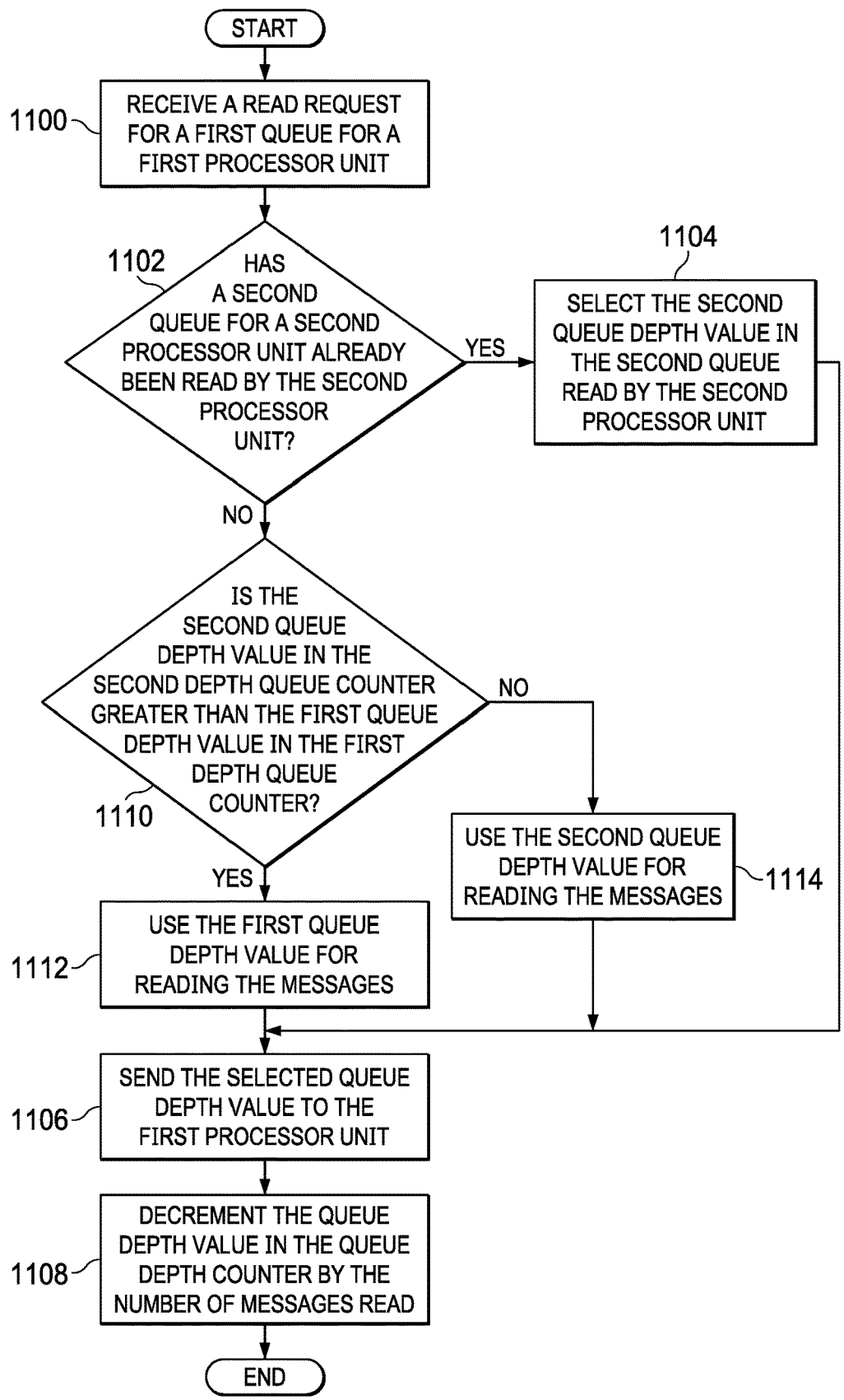
FIG. 11 is an illustration of a flowchart of a process for receiving messages in accordance with an illustrative embodiment.

With reference next to FIG. 11, an illustration of a flowchart of a process for receiving messages is depicted in accordance with an illustrative embodiment. In this illustrative example, the process may be implemented in integrity manager 120 in FIG. 1. This process illustrates pulling messages from a queue.

The process begins by receiving a read request for a first queue for a first processor unit (operation 1100). A determination is made as to whether a second queue for a second processor unit has already been read by the second processor unit (operation 1102). If the second queue has already been read, the process selects the second queue depth value in the second queue read by the second processor unit (operation 1104).

Without the integrity manager, each processor unit typically uses its own queue depth counter for use in reading messages. In the illustrative example, the integrity manager selects a queue depth value from a particular queue depth counter to cause both processor units to read the same number of messages.

The process sends the selected queue depth value to the first processor unit (operation 1106). Operation 1106 enables the first processor unit to read the number of messages indicated based on the queue depth value. The process decrements the queue depth value in the queue depth counter by the number of messages read (operation 1108). In operation 1108, the queue depth counter may be a first queue depth counter for the first processor unit or a second queue depth value for the second processor unit. The queue depth counter decremented is based on which queue depth value was provided to the first processor unit. The process terminates thereafter. In this illustrative example, selection of particular queue depth value from a selected queue depth counter is made such that both processor units use the same queue depth value for reading the messages.

With reference again to operation 1102, if the second queue for the second processor has not already been read, the process determines whether the second queue depth value in the second depth queue counter is greater than the first queue depth value in the first depth queue counter (operation 1110). If the second queue depth value is greater than the first queue depth value, the process uses the first queue depth value for reading the messages (operation 1112). The process then proceeds to operation 1106. Otherwise, the process uses the second queue depth value for reading the messages (operation 1114) and proceeds to operation 1106.

Figure 12:
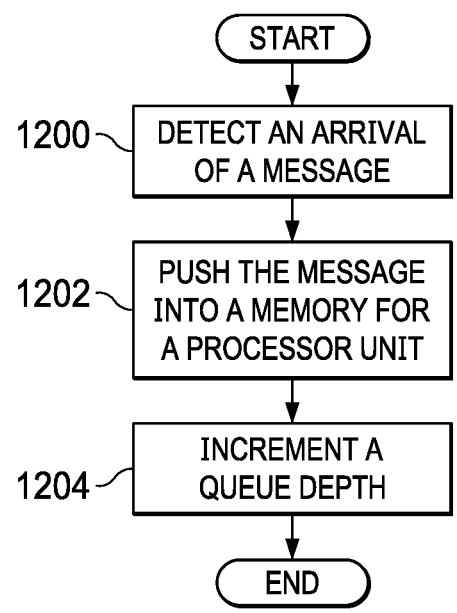
FIG. 12 is an illustration of a flowchart of a process for receiving messages in accordance with an illustrative embodiment.

With reference next to FIG. 12, an illustration of a flowchart of a process for receiving messages is depicted in accordance with an illustrative embodiment. In this illustrative example, the process may be implemented in integrity manager 120 in FIG. 1. This process illustrates pushing messages.

The process begins by detecting an arrival of a message (operation 1200). The process pushes the message into a memory for a processor unit (operation 1202). The process then increments a queue depth (operation 1204) with the process terminating thereafter.

Figure 13:
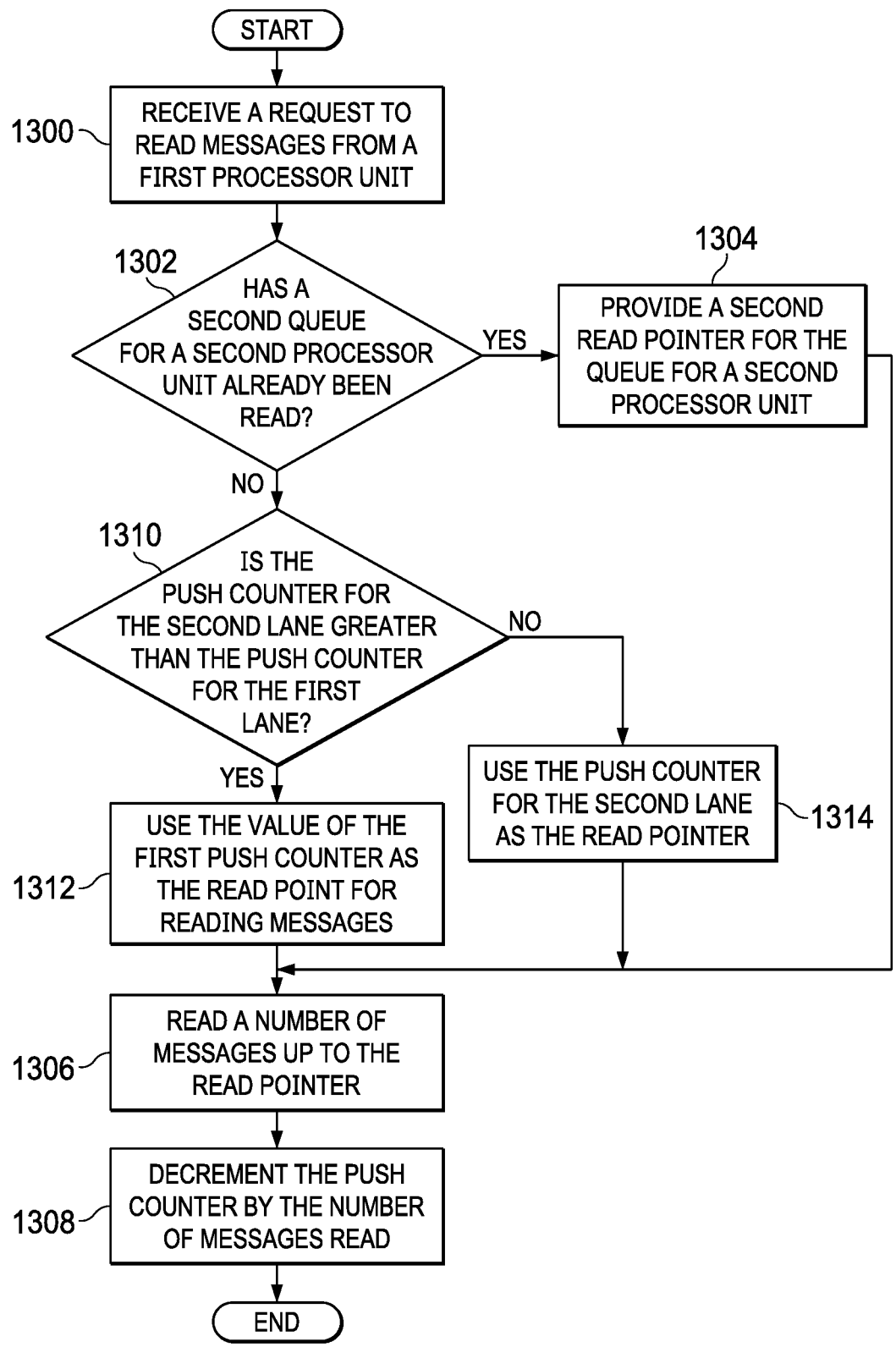
FIG. 13 is an illustration of a flowchart of a process for receiving messages in accordance with an illustrative embodiment.

With reference next to FIG. 13, an illustration of a flowchart of a process for receiving messages is depicted in accordance with an illustrative embodiment. In this illustrative example, the process may be implemented in integrity manager 120 in FIG. 1. This process illustrates pushing messages. This process can be used to tell a processor unit the messages to read from a memory in the processor unit.

The process begins by receiving a request to read messages from a first processor unit (operation 1300). A determination is made as to whether a second queue for a second processor unit has already been read (operation 1302). If the queue has already been read, the process provides a second read pointer for the queue for the second processor unit (operation 1304). In this illustrative example, the read pointer points out how messages can be read from a queue. For example, the read pointer can point to the last message that can be read in the queue by a processor unit. In other words, the read pointer can indicate a queue depth similar to a queue depth value.

The processor unit reads a number of messages up to the read pointer from its internal memory (operation 1306). The messages are pushed by the integrity manager in the example. The integrity manager decrements the push counter by the number of messages read (operation 1308). The process terminates thereafter. When the integrity manager receives a new message, the integrity manager pushes the new message into the memory in the processor unit and updates the push count. The read count is how many of those pushed messages the processor unit is allowed to read. Thus, if X messages are pushed and the processor unit is allowed to read Y messages, X-Y messages are left in the processor memory. Push count is decremented by Y to indicate how many unread messages are left in the memory.

With reference again to operation 1302, if the second queue for the second processor unit has not already been read, the process determines whether the push counter for the second processor unit is greater than the push counter for the first lane (operation 1310). If the push counter for the second queue depth is greater than the first push counter for the first lane, the process uses the value of the first push counter as the read point for reading messages (operation 1312). The process then proceeds to operation 1306. Otherwise, the process uses the push counter for the second lane as the read pointer (operation 1314). The process then proceeds to operation 1306.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram. For example, the process in FIG. 12 is described with respect to reading messages. This process also can be used for writing or sending messages.

Figure 14:
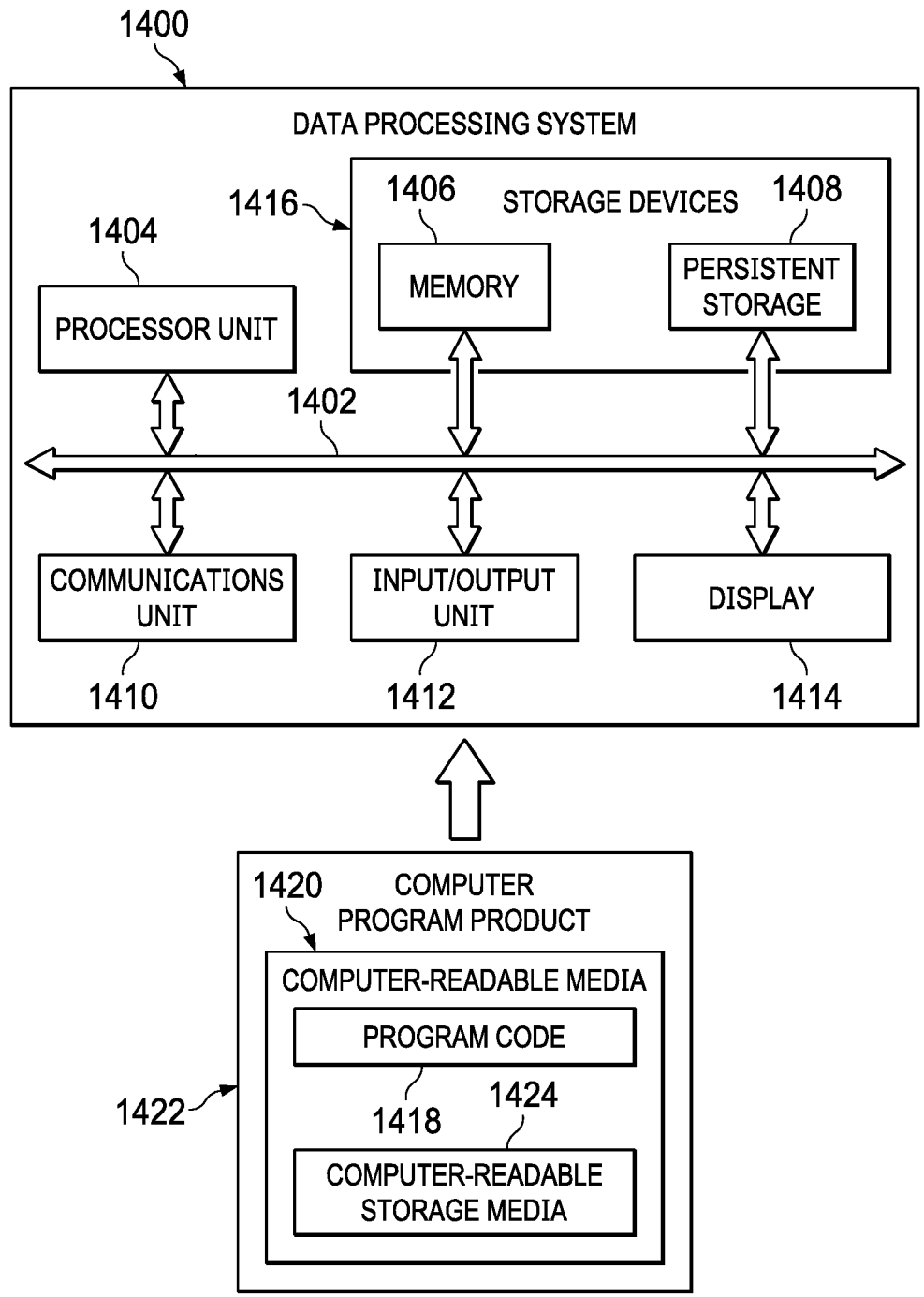
FIG. 14 is an illustration of a block diagram of a data processing system in accordance with an illustrative embodiment.

Turning now to FIG. 14, an illustration of a block diagram of a data processing system is depicted in accordance with an illustrative embodiment. Data processing system 1400 may be used to implement computer system 110 and external node 116 of FIG. 1. In this illustrative example, data processing system 1400 includes communications framework 1402, which provides communications between processor unit 1404, memory 1406, persistent storage 1408, communications unit 1410, input/output (I/O) unit 1412, and display 1414. In this example, communications framework 1402 may take the form of a bus system.

Processor unit 1404 serves to execute instructions for software that may be loaded into memory 1406. Processor unit 1404 may be a number of processors, a multi-processor core, or some other type of processor, depending on the particular implementation.

Memory 1406 and persistent storage 1408 are examples of storage devices 1416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1416 may also be referred to as computer-readable storage devices in these illustrative examples. Memory 1406, in these examples, may be, for example, a random-access memory or any other suitable volatile or non-volatile storage device. Persistent storage 1408 may take various forms, depending on the particular implementation.

For example, persistent storage 1408 may contain one or more components or devices. For example, persistent storage 1408 may be a hard drive, a solid state hard drive, a flash memory, a rewritable optical disk, a rewritable magnetic tape, or some combination of the above. The media used by persistent storage 1408 also may be removable. For example, a removable hard drive may be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that may be connected to data processing system 1400. For example, input/output unit 1412 may provide a connection for user input through at least one of a keyboard, a mouse, or some other suitable input device. Further, input/output unit 1412 may send output to a printer. Display 1414 provides a mechanism to display information to a user.

Instructions for at least one of the operating system, applications, or programs may be located in storage devices 1416, which are in communication with processor unit 1404 through communications framework 1402. The processes of the different embodiments may be performed by processor unit 1404 using computer-implemented instructions, which may be located in a memory, such as memory 1406.

These instructions are referred to as program code, computer usable program code, or computer-readable program code that may be read and executed by a processor in processor unit 1404. The program code in the different embodiments may be embodied on different physical or computer-readable storage media, such as memory 1406 or persistent storage 1408.

Program code 1418 is located in a functional form on computer-readable media 1420 that is selectively removable and may be loaded onto or transferred to data processing system 1400 for execution by processor unit 1404. Program code 1418 and computer-readable media 1420 form computer program product 1422 in these illustrative examples. In the illustrative example, computer-readable media 1420 may be computer-readable storage media 1424. In these illustrative examples, computer-readable storage media 1424 is a physical or tangible storage device used to store program code 1418 rather than a medium that propagates or transmits program code 1418.

Alternatively, program code 1418 may be transferred to data processing system 1400 using a computer-readable signal media. The computer-readable signal media may be, for example, a propagated data signal containing program code 1418. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1400 are not meant to provide architectural limitations to the manner in which different embodiments may be implemented. The different illustrative embodiments may be implemented in a data processing system including components in addition to or in place of those illustrated for data processing system 1400. Other components shown in FIG. 14 can be varied from the illustrative examples shown. The different embodiments may be implemented using any hardware device or system capable of running program code 1418.

Figure 15:
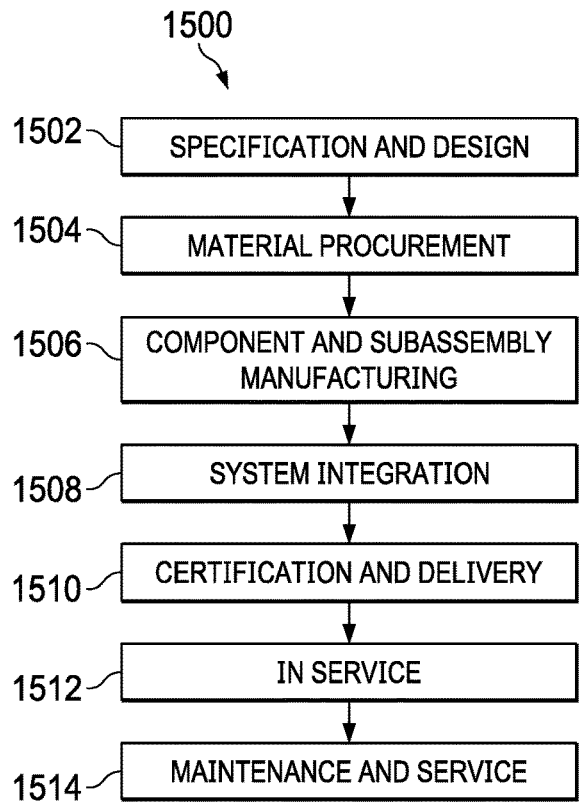
FIG. 15 is an illustration of a block diagram of an aircraft manufacturing and service method in accordance with an illustrative embodiment.
Figure 16:
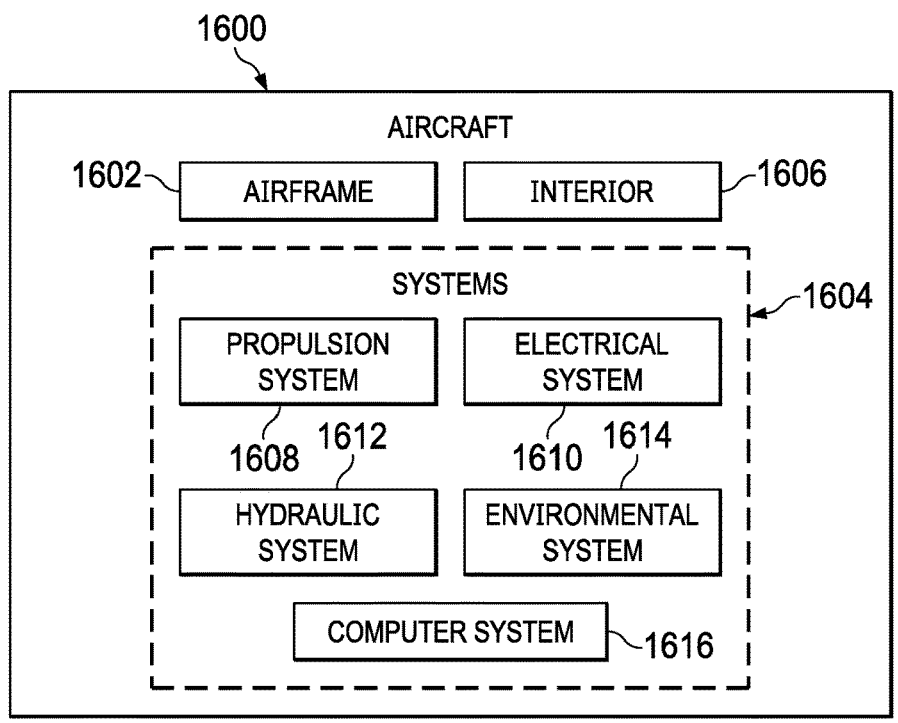
FIG. 16 is an illustration of a block diagram of an aircraft in which an illustrative embodiment may be implemented.

The illustrative embodiments of the disclosure may be described in the context of aircraft manufacturing and service method 1500 as shown in FIG. 15 and aircraft 1600 as shown in FIG. 16. Turning first to FIG. 15, an illustration of a block diagram of an aircraft manufacturing and service method is depicted in accordance with an illustrative embodiment. During pre-production, aircraft manufacturing and service method 1500 may include specification and design 1502 of aircraft 1600 in FIG. 16 and material procurement 1504.

During production, component and subassembly manufacturing 1506 and system integration 1508 of aircraft 1600 takes place. Thereafter, aircraft 1600 may go through certification and delivery 1510 in order to be placed in service 1512. While in service 1512 by a customer, aircraft 1600 is scheduled for routine maintenance and service 1514, which may include modification, reconfiguration, refurbishment, and other maintenance or service.

Each of the processes of aircraft manufacturing and service method 1500 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, an illustration of a block diagram of an aircraft is depicted in which an illustrative embodiment may be implemented. In this example, aircraft 1600 is produced by aircraft manufacturing and service method 1500 in FIG. 15 and may include airframe 1602 with plurality of systems 1604 and interior 1606. Examples of systems 1604 include one or more of propulsion system 1608, electrical system 1610, hydraulic system 1612, environmental system 1614, and computer system 1616. Any number of other systems may be included. Although an aerospace example is shown, different illustrative embodiments may be applied to other industries, such as the automotive industry. The apparatuses and methods embodied herein may be employed during at least one of the stages of aircraft manufacturing and service method 1500 in FIG. 15.

In one illustrative example, components or subassemblies produced in component and subassembly manufacturing 1506 in FIG. 15 may be fabricated or manufactured in a manner similar to components or subassemblies produced while aircraft 1600 is in service 1512 in FIG. 15. As yet another example, one or more apparatus embodiments, method embodiments, or a combination thereof may be utilized during production stages, such as component and subassembly manufacturing 1506 and system integration 1508 in FIG. 15. One or more apparatus embodiments, method embodiments, or a combination thereof may be utilized while aircraft 1600 is in service 1512, during maintenance and service 1514 in FIG. 15, or both.

For example, at least one of a data manager such as data manager 112 in FIG. 1 or one or more internal synchronizers such as internal synchronizers 124 can be implemented in computer system 1616 in aircraft 1600. The use of these components can enable processing of data in mixed integrity modes. The different components can enable the synchronizing the processing of data, the exchange of messages, or some combination thereof in a more efficient manner as compared to currently used computer systems.

The implementation of the use of a number of the different illustrative embodiments may substantially expedite the assembly of aircraft 1600, reduce the cost of aircraft 1600, or both expedite the assembly of aircraft 1600 and reduce the cost of aircraft 1600. The increased efficiency in processing data may reduce at least one of the size or number of computers needed in aircraft 1600. This increased efficiency may increase the processing capabilities of currently used data processing systems in aircraft, thus reducing the amount of maintenance and refurbishment.

Thus, one or more illustrative examples can be used to reduce the cost of overhead processing data by processor systems in platforms such as aircraft or another suitable platform. Another type of platform includes, for example, a mobile platform, a stationary platform, a land-based structure, an aquatic-based structure, and a space-based structure. More specifically, the platform may be a surface ship, a tank, a personnel carrier, a train, a spacecraft, a space station, a satellite, a submarine, an automobile, a power plant, a bridge, a dam, a house, a manufacturing facility, a building, and other suitable platforms.

One or more technical solutions are present that overcome a technical problem with obtaining desired efficiency in redundancy for processing data using processor units. As a result, one or more technical solutions can increase efficiency in processing data by processor units. For example, one or more technical solutions may enable at least one of aligning the timing in the processing data or processing messages by processor units operating in a high integrity mode. As a result, the processor units can process data using a high integrity mode, a standard integrity mode, or some combination thereof either separately or at substantially the same time.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. For example, the illustrative embodiments have been described with respect to mixed integrity modes, and illustrative embodiment can be applied to processors running lockstep, or other types of environments in which at least one of processing synchronization or message exchange are designed. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A processor synchronization system comprising:
an internal synchronizer running on a first processor unit, wherein the internal synchronizer is configured to communicate with an external synchronizer to determine whether an undesired amount of skew is present between the first processor unit and a second processor unit in communication with the external synchronizer, and selectively direct the first processor unit to perform an action without generating a needed result such that an undesired amount of skew between the first processor unit and the second processor unit is reduced when the undesired amount of skew is present, wherein the action removes a pre-scheduled idle time from the first processor unit, wherein the first processor unit and the second processor unit are associated with each other for a high integrity mode in which integrity checks are performed on corresponding messages generated by the first processor unit and the second processor unit.

2. The processor synchronization system of claim 1, wherein the first processor unit and the second processor unit are of a same type.

3. The processor synchronization system of claim 1, wherein the first processor unit and the second processor unit are of a different type.

4. The processor synchronization system of claim 1, wherein the external synchronizer stores information about the undesired amount of skew between the first processor unit and the second processor unit.

5. The processor synchronization system of claim 4, wherein the external synchronizer stores the information about the undesired amount of skew in registers, and wherein in communicating with the external synchronizer to determine whether the undesired amount of skew is present between the first processor unit and the second processor unit in communication with the processor synchronization system, the internal synchronizer is configured to write to a first register for the first processor unit in the external synchronizer and read a second register for the second processor unit in the external synchronizer and compares values of the first register with the second register to determine when the first processor unit and the second processor unit are aligned to synchronously process instructions.

6. The processor synchronization system of claim 1, wherein the external synchronizer includes a first clock for the first processor unit and a second clock for the second processor unit, wherein the first clock and the second clock are used to align the first processor unit and the second processor unit to synchronously process instructions.

7. The processor synchronization system of claim 6, wherein the first processor unit is a leading processor unit; the second processor unit is a lagging processor unit; a difference register returns a value of zero to the leading processor unit; and the difference register returns a value of the undesired amount of skew to the lagging processor unit.

8. The processor synchronization system of claim 1, wherein the the pre-scheduled idle time is removed in response to the internal synchronizer in the first processor unit detecting that the first processor unit is slower than the second processor unit that reduces the undesired amount of skew between the first processor unit and the second processor unit.

9. The processor synchronization system of claim 8, wherein the internal synchronizer is configured to remove an additional pre-scheduled idle time if the undesired amount of skew is still present between the first processor unit and the second processor unit after removing the pre-scheduled idle time.

10. The processor synchronization system of claim 1, wherein the first processor unit is a leading processor unit and the second processor unit is a lagging processor unit, and the action causes the first processor unit to add pre-scheduled idle time that causes the first processor unit to operate slower.

11. The processor synchronization system of claim 1 further comprising:
 a third processor unit, wherein the internal synchronizer is configured to communicate with the external synchronizer to determine whether the undesired amount of skew is present between the first processor unit, the second processor unit, and the third processor unit in communication with the external synchronizer, and selectively direct the first processor unit to perform the action without generating the needed result such that the undesired amount of skew between the first processor unit, the second processor unit, and the third processor unit is reduced when the undesired amount of skew is present.

12. The processor synchronization system of claim 1, wherein the first processor unit and the second processor unit are each selected from a group comprising at least one of a multi-core processor unit, a single core processor unit, a homogeneous multi-core processor unit, a heterogeneous multi-core processor unit, a graphics processor unit, and a general-purpose processor unit.

13. The processor synchronization system of claim 1, wherein the internal synchronizer comprises at least one of software or hardware running on the first processor unit.

14. A method for synchronizing processor units, the method comprising:
 communicating with an external synchronizer to determine whether an undesired amount of skew is present between a first processor unit and a second processor unit in communication with a synchronization system; and
 selectively directing the first processor unit to perform an action without generating a needed result such that the undesired amount of skew between the first processor unit and the second processor unit is reduced when the undesired amount of skew is present in the first processor unit, wherein the action removes a pre-scheduled idle time from the first processor unit, wherein the first processor unit and the second processor unit are associated with each other for a high integrity mode in which integrity checks are performed on corresponding messages generated by the first processor unit and the second processor unit.

15. The method of claim 14, wherein the first processor unit and the second processor unit are of a same type.

16. The method of claim 14, wherein the first processor unit and the second processor unit are of a different type.

17. The method of claim 14 further comprising:
 storing information about the undesired amount of skew between the first processor unit and the second processor unit in the external synchronizer.

18. The method of claim 17, wherein the external synchronizer stores information about the undesired amount of skew in registers, wherein communicating with the synchronization system to determine whether the undesired amount of skew is present between the first processor unit and the second processor unit in communication with the synchronization system comprises:
 writing to a first register for the first processor unit in the synchronization system;
 reading a second register for the second processor unit in the synchronization system; and
 comparing values of the first register with the second register to determine when the first processor unit and the second processor unit are aligned to synchronously process instructions.

19. The method of claim 14, wherein the external synchronizer includes a first clock for the first processor unit and a second clock for the second processor unit, and wherein the external synchronizer reads a register for the second clock for the second processor unit.

20. The method of claim 14, wherein removing the pre-scheduled idle time from the first processor unit that reduces the undesired amount of skew between the first processor unit and the second processor unit.

21. The method of claim 20 further comprising:
 removing configured to remove an additional pre-scheduled idle time if the undesired amount of skew is still present between the first processor unit and the second processor unit after removing the pre-scheduled idle time.

22. The method of claim 14, wherein the first processor unit is a leading processor unit and the second processor unit is a lagging processor unit and a number of instructions causes the first processor unit to become idle.

23. The method of claim 14, wherein a third processor unit is present and further comprising:
 communicating with the external synchronizer to determine whether the undesired amount of skew is present between the first processor unit, the second processor unit, and the third processor unit in communication with the synchronization system; and
 selectively directing the first processor unit to perform the action without generating the needed result such that the undesired amount of skew between the first processor unit, the second processor unit, and the third processor unit is reduced when the undesired amount of skew is present and when the first processor unit, the second processor unit, and the third processor unit are associated with each other for a high integrity mode in which integrity checks are performed on corresponding messages generated by the first processor unit, the second processor unit, and the third processor unit.

24. The method of claim 14, wherein the first processor unit and the second processor unit are each selected from a group comprising at least one of a multi-core processor unit, a single core processor unit, a homogeneous multi-core processor unit, a heterogeneous multi-core processor unit, a graphics processor unit, and a general-purpose processor unit.

* * * * *